March 6, 1945.  R. A. BRADLEY  2,370,773
VEHICLE AXLE
Filed Sept. 10, 1943
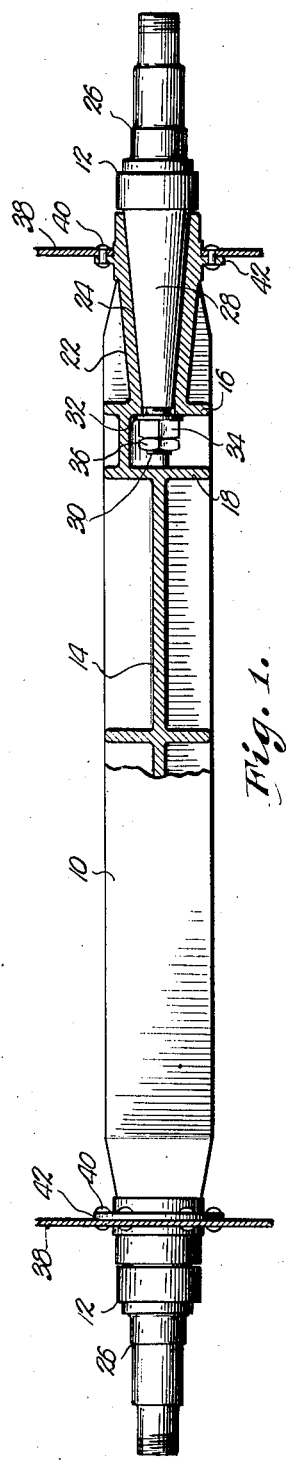
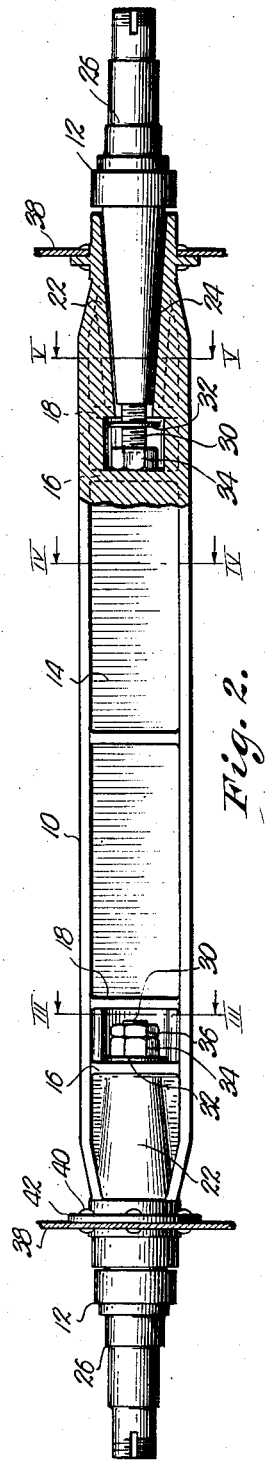
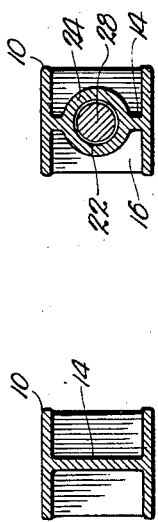
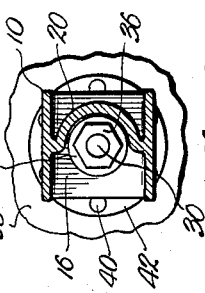
INVENTOR.
Ralph A. Bradley
BY
ATTORNEY.

Patented Mar. 6, 1945

2,370,773

UNITED STATES PATENT OFFICE 2,370,773

VEHICLE AXLE

Ralph A. Bradley, Minneapolis, Minn.

Application September 10, 1943, Serial No. 501,828

4 Claims. (Cl. 301—132)

This invention relates to vehicle axles and more particularly to units of that character commonly termed "dead" axles, and used on all types of vehicles requiring stationary axles having spindles whereon wheels can freely rotate.

One example of a vehicle having the above type axle is a transport trailer and in equipment of this character, it is not uncommon that excessive loads, or defective material results in breakage of the axle. This usually occurs at the point where the spindle joins the main section of the axle. Such breakage necessitates that the entire axle be replaced, which not only incurs considerable expense, but often proves to be a very difficult procedure since the trailer body together with its load must be elevated sufficiently to permit replacement of the axle. This task is made even more difficult due to the fact that replacements must frequently be made on soft shoulders of highways.

It is the primary object of this invention, therefore, to provide an axle of the above character, having removable spindles, which, in the event of breakage, may be quickly replaced with a minimum amount of effort.

A further aim of the invention is the provision of an axle with removable spindles and means for anchoring the spindles to the main section of the axle, said anchoring means serving also to dislodge the spindle from the axle body when its removal becomes necessary.

A yet further aim of the invention is to provide an axle with replaceable spindles to materially reduce the cost of repairing broken or bady worn axle assemblies.

Other objects will become apparent during the course of the following specification, referring to the accompanying drawing, wherein:

Fig. 1 is a plan view of an axle constructed in accordance with this invention, one end of the axle being shown in central horizontal section.

Fig. 2 is an elevational view of the axle with an end portion shown in central vertical section and with a spindle dislodged from seating engagement with the axle body.

Fig. 3 is a cross section on line III—III of Fig. 2.

Fig. 4 is a cross section of the axle taken on line IV—IV of Fig. 2; and

Fig. 5 is a cross section of the axle and spindle taken on line V—V of Fig. 2.

The axle assembly comprising this invention includes a main body section 10 and removable end spindles 12. Body section 10 may be built up in various ways or formed of tubular stock but preferably comprises an H member having a central longitudinal web 14 and a pair of spaced apart cross webs 16 and 18, relatively near each end of the section. Webs 16 and 18 are joined by a semi-circular web section 20. An inwardly tapering boss 22 formed on each end of body 10 is provided with a similarly tapered bore 24 extending through web 18.

Spindles 12 include the usual outer end portions 26 for journalling conventional wheels and bearings (not shown). The inner ends of spindles 12 comprise portions 28 tapered inwardly to conform with the taper of bore 24 and terminate in reduced threaded ends 30 for each receiving a washer 32 and nuts 34 and 36.

From Fig. 1 it will be clear that nut 34 serves to draw the tapered end 28 of spindle 12 firmly into the bore of boss 22 and nut 36 is employed to prevent accidental unthreading of nut 34. It should be noted that a clearance is maintained between web 18 and the end face of threaded portion 30, and that this clearance is slightly greater than the thickness of lock nut 36. Moreover, it is further important that the thickness of nut 34 be greater than the clearance between threaded end 30 and web 18 for a purpose clearly illustrated in Fig. 2. When nut 34 is unthreaded from end portion 30, after lock nut 36 has been entirely removed therefrom, it will engage web or stop wall 18 and continued unthreading of the nut will serve to free the tapered portion 28 of the spindle from fixed relation with boss 22. This feature is very important since it renders the replacement of a spindle a very easy and rapid operation.

Web 20 is semi-circular in shape to provide for access to nuts 34 and 36 when a wrench or suitable tool is to be applied for manipulating the nuts.

A brake drum 38 may be secured by rivets 40 to a radial flange 42 formed on boss 22.

When spindle portions 28 are firmly drawn by nut 34 into bores 24, the assembly is the equivalent of a unitary axle, both as to strength and operation. Should a spindle member become broken or excessively worn, it can be easily relieved from relatively fixed engagement with the axle body 10 by completely removing lock nut 36 and unthreading nut 34 until it bears against web 18 and forces the spindle outwardly from boss 22.

To install a new spindle the nut 34 and washer 32 are first inserted between webs 16 and 18 into axial alignment with bore 24. The new spindle is then inserted in the bore and its end 30 passed through washer 32 and threaded into the nut 34.

Continued threading of nut 34 onto end 30 seats spindle section 24 firmly in bore 24 and the application of lock nut 36 to prevent displacement of nut 34 completes the operation.

It is conceivable that axle assemblies having physical characteristics other than those shown and described might be made without departing from the spirit of this invention, and it is desired therefore, to be limited only by the scope of the appended claims.

Having thus described the invention, what is claimed as new and desired to be secured by Letters Patent is:

1. In an axle assembly of the character described, a main body section having a bore in each end and a stop wall in spaced relation with said bore; a spindle having a portion extending into the bore and terminating in a threaded end; and a nut engageable with said threaded end for drawing said spindle portion into the bore and arranged to bear against the stop wall when substantially unthreaded from said end to force the spindle outwardly from said bore.

2. In an axle assembly of the character described, a main body section having a tapered bore in each end and a stop wall in spaced relation with said bore; a spindle having a tapered portion extending into the bore and terminating in a threaded end; and a nut engageable with said threaded end for drawing said tapered portion into the bore, said nut being dimensioned to bear against the stop wall when substantially unthreaded from said end to force the spindle outwardly from said bore.

3. In an axle assembly of the character described, a main body section having a tapered bore in each end and a stop wall in spaced relation with said bore; a spindle having a tapered portion for seating in said bore and terminating in a threaded inner end spaced from the stop wall when said tapered portion is firmly seated in the bore; and a nut engageable with said threaded end for drawing said tapered portion into the bore, the thickness of said nut being greater than the spacing between said stop wall and the threaded end of the spindle when the latter is operably seated in said bore to effect displacement of the spindle from the bore when the nut is substantially unthreaded from said inner end.

4. In an axle assembly of the character described, a main body section having a tapered bore in each end and a stop wall in spaced relation with said bore; a spindle having a tapered portion for seating in said bore and terminating in a threaded inner end spaced from the stop wall when said tapered portion is firmly seated in the bore; a nut engageable with said threaded end for drawing said tapered portion into the bore, the thickness of said nut being greater than the spacing between said stop wall and the threaded end of the spindle when the latter is operably seated in said bore to effect displacement of the spindle from the bore when the nut is substantially unthreaded from said inner end; and a lock nut of less thickness than said spacing between the stop wall and the inner end of the spindle and threaded on said end against said first-named nut to hold the latter in place.

RALPH A. BRADLEY.